Aug. 24, 1937.　　　　J. TJAARDA　　　　2,091,059
INSTRUMENT PANEL
Filed May 28, 1936　　　2 Sheets-Sheet 1

INVENTOR.
John Tjaarda.
BY
ATTORNEYS.

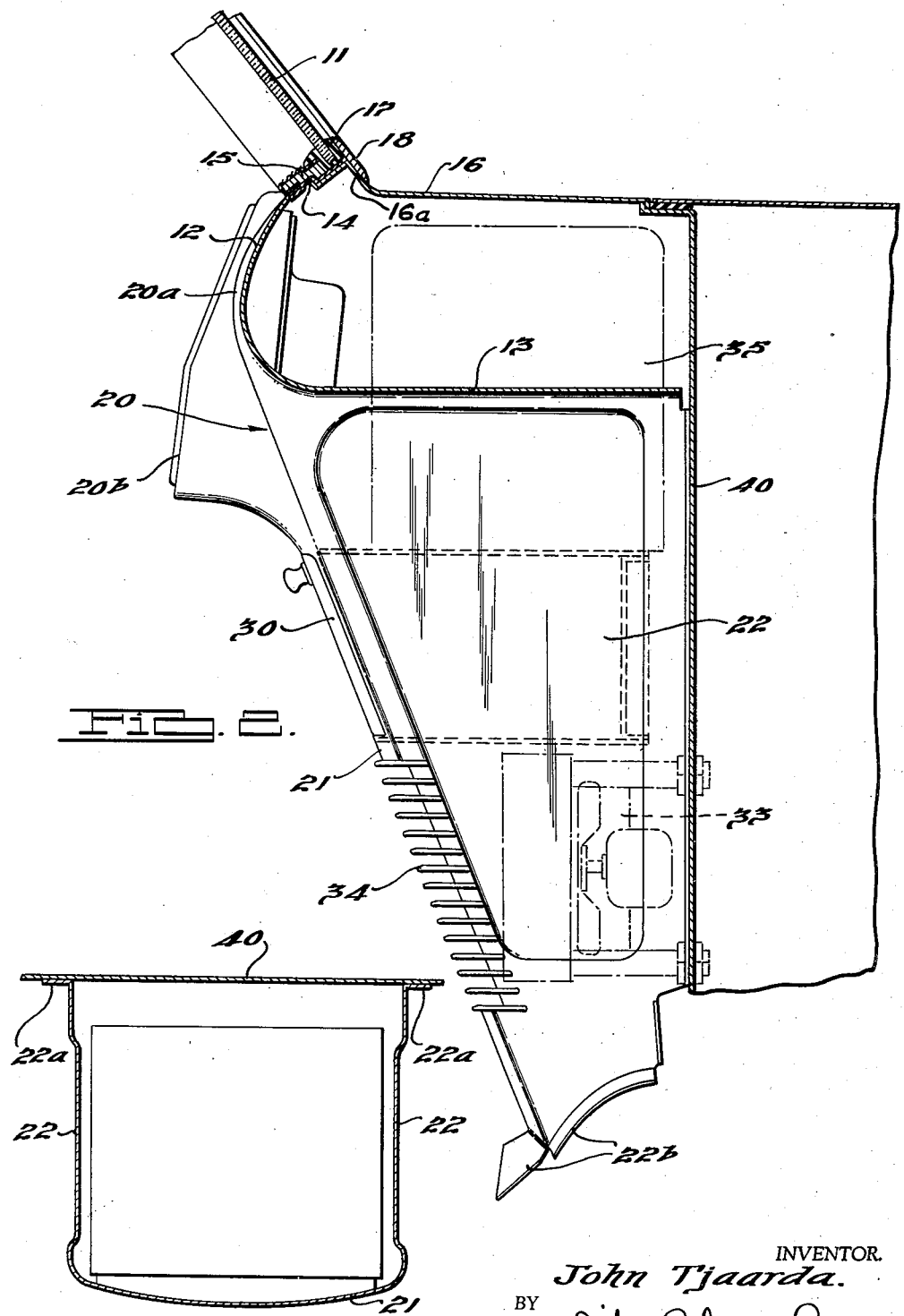

Patented Aug. 24, 1937

2,091,059

UNITED STATES PATENT OFFICE 2,091,059

INSTRUMENT PANEL

John Tjaarda, Birmingham, Mich., assignor to Briggs Manufacturing Company, Detroit, Mich., a corporation of Michigan Application May 28, 1936, Serial No. 82,349

13 Claims. (Cl. 180—90)

This invention relates to the front end construction of motor vehicle bodies and more particularly to instrument panels therefor.

One of the objects of the present invention is to provide a front end construction which utilizes the room available adjacent the belt panel and dash and beneath the windshield at the front of the vehicle in a more efficient way.

A further object of the invention is to provide a transverse instrument panel having a central vertical leg, said panel not only housing within itself the instruments, which it has heretofore been common to place therein, but also other attachments which are usually installed at the front of the passenger compartment of the vehicle, such for instance as a radio or a heater.

A still further object of the invention is to provide a T-shaped instrument panel which has its vertical leg located in the middle of the front part of the passenger compartment, thus effectively utilizing the room between the two front seats, which room is usually wasted; and which by having its horizontal portion extending rearwardly utilizes the available space above the occupant's feet.

A still further object of the invention is to provide an instrument panel which imparts increased strength and rigidity to the front end of the body, improving at the same time the appearance of the interior of the vehicle body by imparting to it the appearance of unusual strength and sturdiness.

A further object of the invention is to provide a novel instrument panel in which the control instruments, switches and knobs may be grouped compactly in the middle thereof, partly in a vertical arrangement, thus facilitating operation of the vehicle and minimizing dangerous distraction of the driver's attention when looking at the instruments on the panel or manipulating control members thereon as may be the case with conventional structures having control instruments located on a panel in a long horizontal row.

A still further object of the invention is to provide a novel instrument panel so housing the heater that the heated air discharged thereby is directed rearwardly of the vehicle between the two occupants of the front seats, instead of discharging the heated air directly against an occupant thereof.

Another object of the invention is to provide a novel instrument panel with a speedometer centrally located and made of a large size; the surface of the dial of the speedometer and other indicating instruments being placed at a substantially right angle to the line of vision of the driver, thus facilitating observation and adding to the safety of operating the vehicle at high speeds.

It is a still further object of the invention to provide an instrument panel of the above character which can be stamped out and formed, if desired, from a single metal blank, eliminating separate casings for the heater and the radio, thus decreasing the cost of manufacture and eliminating places where dust and dirt may easily collect and be difficult to remove.

Other objects and advantages of this invention will appear in the following description and appended claims, reference being had to the accompanying drawings forming a part of this specification wherein like reference characters designate corresponding parts in the several views.

Fig. 2 is a vertical sectional view of the panel, section being taken on the line 2—2 of Fig. 1, looking in the direction of the arrows.

Fig. 3 is a horizontal section of the vertical leg of the panel, section being taken on the line 3—3 of Fig. 1, looking in the direction of the arrows.

Figure 1:
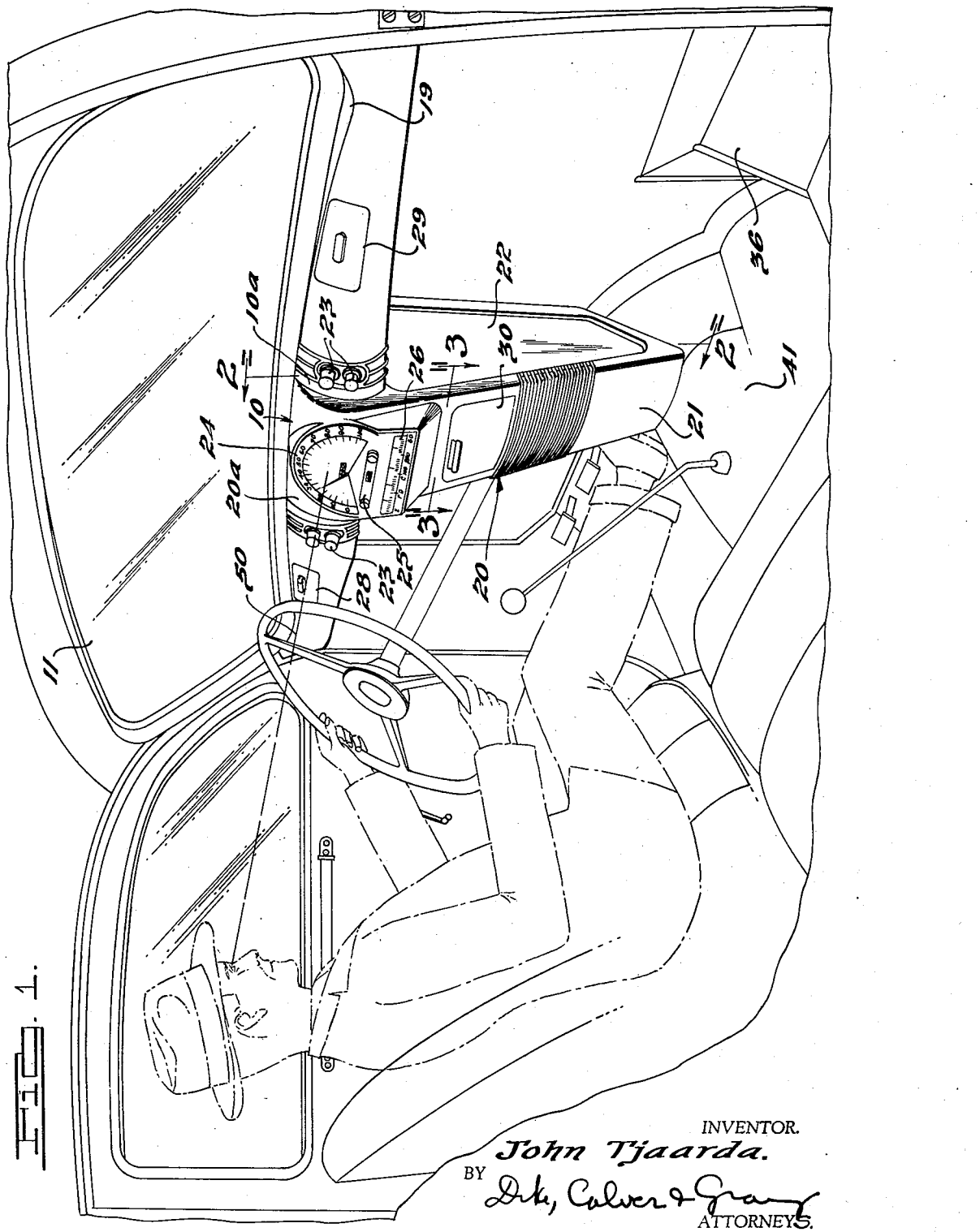
Fig. 1 is a perspective view of the front part of a passenger compartment of a vehicle, provided with a front panel embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings, there is shown by way of example, a vehicle body provided with a front end including a T-shaped instrument or front panel embodying the present invention, with an exemplary arrangement of indicating instruments and controls, and providing room for a number of compartments, as well as housing a radio and a conventional heater.

Referring particularly to Fig. 1, the instrument panel comprises a horizontal portion 10 disposed transversely of the vehicle subjacently of the windshield 11 thereof, and in a suitable spaced relation to the front seat of the vehicle. As shown in Fig. 2, said horizontal portion 10 is made with convex front 12 and a flat bottom 13. The upper edge of said convex horizontal portion 12 is secured by welding to a transverse belt panel or bar 14 concealed by a suitable garnish molding 15. The belt panel 14 is in turn spot welded or otherwise secured to the flange 16a of the cowl 16. The windshield in the present instance is of the fixed or stationary type, the edge thereof being incased in a channel shaped rubber sealing strip 17 held in position against the molding 15 by an exterior molding 18. The outer ends 19 of the horizontal portion 10 of the panel are secured to the front pillars of the vehicle body in any conventional manner. The central part 10a of the instrument panel constitutes a place of juncture of said horizontal portion 10 with a vertical leg 20 extending from said portion 10 downward to the floor of the passenger compartment of the vehicle, thus giving the entire front panel a T-shaped form. The lower front face 21 of said leg 20, as shown in Fig. 2, is constructed so as to incline or slope downwardly and forward in order to provide more room for the gear shift and hand brake levers and in order to bring the top portion 20a closer to the front seat of the vehicle. The vertical sides 22, 22 of said leg 20 extend from the inclined face 21 toward the front of the vehicle and have vertical flanges 22a spot-welded or otherwise secured to the dash 40. The leg 20 also has suitable flanges 22b at its bottom for attachment by spot-welding or otherwise to the floor or floor pan 41 of the body.

As can be easily appreciated from the description, the T-shaped panel constitutes a structure presenting ample surfaces for accommodating numerous indicating instruments, switches and knobs, which it may be desirable to place thereon. Such instruments, switches and knobs may be very conveniently arranged at the portions 20a and 10a which extend toward the front seat, thus bringing such instruments much closer to the driver than it is possible with conventional instrument panels. I prefer to group all indicating instruments at the portion 20a placing the dials, and scales thereof substantially at a right angle to the driver's line of vision, indicated by the line 50, thus facilitating observation by making said instruments more visible.

As shown in Fig. 1, the speedometer 24 is centrally located at the portion 20a, is made of large size, and is very conveniently located for the driver's observation. Immediately subjacent thereto at the portion 20b there are arranged a mileage indicator scale 25 and an oil and gas indicator scale or gauge 26. Other indicating instruments may be similarly arranged at said portion 20a, being centrally grouped, brought toward the driver, and placed at approximately right angle to his line of vision. These features of my invention foster greater safety, particularly in fast driving, than where the indicating instruments are arranged at a considerable distance from the driver and are not placed at a right angle to his line of vision.

On both sides of the upper central portion 20a there is ample and convenient room for a number of switches or knobs such as 23, 23, which may be grouped at both sides of the space occupied by the indicating instruments. Inclined arrangement of the convex front 12 of the horizontal portion 10 permits placing control knobs in the position where they are operable by an inclined rather than a straight horizontal pull, which makes the necessary operating effort considerably easier.

Ample room is available in my novel front panel for a number of compartments, such as 28, 29 and 30, which compartments may be made very spacious and provide ample storage space within easy reach of the occupants of the front seats.

It is an important advantage of my invention that special attachments usually placed within the leg space of the front of the passenger compartment, such as a heater, or a radio, may be moved and arranged within my novel front panel, preferably within the vertical leg thereof, and completely enclosed therein. Such an arrangement possesses many advantages not found in conventional structures. For instance, removing such devices from the leg space leaves the entire available room thereof for a more comfortable position of the occupant of the front seat. It also eliminates dark places, difficult to reach and to clean, and prevents accumulation of dust on such devices as the heater, which dust may be later blown into the occupants' faces by the action of the heater.

In vehicles equipped with my novel front panel the leg space 36 is open, very spacious and is easy to keep clean. The converging walls thereof give the illusion of extreme depth, thus eliminating the unpleasant appearance of an abruptly terminating leg space possessed by conventional structures.

I prefer to install the heater 33 within the lower portion of the vertical leg 20, and the radio such as 35, in the space available behind the speedometer 24, leaving the compartment 30 available for use as a storage space for gloves, small packages and the like. However, I do not desire to be limited to this particular arrangement, since any other convenient arrangement may be advantageously utilized.

If a heater such as 33 is installed within the vertical leg 20, the front surface 21 of said leg 20 may be provided with a suitable grill, such as 34. If desired, a radio may be placed within the compartment 30, and the front wall of said compartment also provided with a suitable grill.

As a result of arranging the heater within the vertical leg of the panel, the heated air discharged by said heater is not blown at the occupant of the front seat next to the driver, but is directed between the driver and said occupant, which gives a more uniform distribution of heating effect.

The entire panel structure constructed in accordance with the invention presents an appearance of unusual strength and sturdiness, making riding more pleasing. My invention also contributes to the actual strength of the body, since very strong body reenforcing members of large cross section may be arranged within the panel without affecting the appearance of the interior of the vehicle. The T-shaped box-like construction of the panel provides a vertical tie between the transverse belt panel connecting the pillars and the floor pan, thus greatly reenforcing the front end of the body.

Thus, in one of its broader aspects my invention contemplates providing a novel T-shaped front panel for motor vehicles, with the indicating instruments and controls grouped at the place of juncture of the horizontal portion and the vertical leg thereof, said leg adapted to house such attachments as a radio, a heater and the like.

Although only one embodiment of my invention has been illustrated and described, the same is capable of many modifications which are within the purview of my invention. For instance, indicating instruments may be differently arranged; compartments may be located in different places; more than one vertical leg may be provided, and the entire structure may be used in other motor vehicles, such for instance as airplanes.

I claim:

1. In a vehicle body having a compartment with a floor structure, an instrument panel comprising a horizontal portion extending above and in spaced relation to the floor structure, and a vertical leg extending from said horizontal portion to said floor structure.

2. In a vehicle body including a floor and a front end including a T-shaped instrument panel adapted to have indicating and control instruments operatively arranged thereon, said panel having a portion extending down to said floor.

3. In a vehicle having a passenger compartment including a floor structure, a T-shaped instrument panel arranged at the front of said compartment and adapted to have indicating and control instruments operatively arranged thereon, said panel having a portion extending downwardly substantially to said floor structure.

4. In a vehicle having a passenger compartment, a T-shaped instrument panel arranged at the front of said compartment, said panel comprising a horizontal portion extending above and in spaced relation to the floor of the compartment, and a vertical leg of box-like construction extending downward from a point adjacent the middle of said horizontal portion to the floor of the compartment.

5. In a vehicle having a passenger compartment, a T-shaped instrument panel arranged at the front of said compartment, said panel comprising a horizontal portion extending above and in spaced relation to the floor of the compartment, and a vertical leg of box-like construction extending downward from a point adjacent the middle of said horizontal portion to the floor of the compartment, the place of juncture of said horizontal portion and said vertical leg lying rearward of the lower end of said leg.

6. In a vehicle having a passenger compartment, a T-shaped instrument panel arranged at the front of said compartment, said panel comprising a transverse horizontal portion above the floor of the compartment, and a hollow vertical leg extending downward from an intermediate part of said horizontal portion to the floor of the compartment, the place of juncture of said horizontal portion and said vertical leg lying rearward of the lower end of the leg, and indicating instruments grouped at said place of juncture.

7. In a vehicle having a passenger compartment, a T-shaped instrument panel arranged at the front of said compartment, said panel comprising a transverse horizontal portion above the floor of the compartment, and a hollow vertical leg extending downward from an intermediate part of said horizontal portion to the floor of the compartment, the place of juncture of said horizontal portion and said vertical leg lying rearward of the lower end of the leg, and having its rear face extending in an approximate plane substantially at right angles to the driver's line of vision.

8. In a vehicle having a passenger compartment provided with a floor, a front panel comprising a transverse portion spaced above the floor of said compartment, and a hollow vertical leg, said leg having a compartment for an appliance and extending downwardly to said compartment floor.

9. In a vehicle having a passenger compartment, a dash, a front panel comprising a hollow transverse horizontal portion spaced above the floor of said compartment, and a hollow vertical leg extending from said portion at an intermediate point thereof, said horizontal portion and said vertical leg being provided with storage compartments.

10. In a vehicle having a passenger compartment, a dash, a front panel comprising a hollow transverse horizontal portion spaced above the floor of said compartment, and a hollow vertical leg extending from said portion at an intermediate point thereof, said horizontal portion and said vertical leg being provided with storage compartments, and said vertical leg being secured to the dash.

11. In a vehicle having a passenger compartment, a windshield, a cowl and a dash; an instrument panel comprising a hollow transverse portion extending below said windshield, and a hollow vertical leg extending from the middle of said horizontal portion to the floor of the compartment and having one or more storage compartments.

12. In a vehicle having a passenger compartment, a windshield, a cowl and a dash; an instrument panel comprising a hollow transverse portion extending below said windshield, and a hollow vertical leg extending from the middle of said horizontal portion to the floor of the compartment and having one or more storage compartments, the rear vertical face of said leg being inclined downward in the direction of the dash.

13. In a vehicle having a passenger compartment, a windshield, a cowl and a dash; an instrument panel comprising a hollow transverse portion extending below said windshield, and a hollow vertical leg extending from the middle of said horizontal portion to the floor of the compartment and having one or more storage compartments, said leg being pressed from sheet metal into hollow box-like construction and having its opposite sides secured to the dash.

JOHN TJAARDA.